United States Patent [19]
Schütze

[11] Patent Number: 5,357,729
[45] Date of Patent: Oct. 25, 1994

[54] FRAMEWORK MADE FROM THIN-WALLED ROUND COMPOSITE FIBRE RODS

[75] Inventor: Rainer Schütze, Braunschweig, Fed. Rep. of Germany

[73] Assignee: Deutsche Forschungsanstalt fur Luft-u Raumfahat e.V., Braunschweig, Fed. Rep. of Germany

[21] Appl. No.: 21,317

[22] Filed: Feb. 23, 1993

[30] Foreign Application Priority Data

Feb. 26, 1992 [DE] Fed. Rep. of Germany ....... 4205834
Sep. 17, 1992 [DE] Fed. Rep. of Germany ....... 4231067

[51] Int. Cl.$^5$ ............................................ E04H 12/02
[52] U.S. Cl. ................................. 52/653.2; 52/309.2; 52/309.4; 52/651.09; 52/721; 403/188
[58] Field of Search .............. 52/309.1, 309.2, 309.4, 52/651.01, 651.07, 651.08, 651.09, 653.2, 721; 156/71; 403/170, 187, 188, 217, 404

[56] References Cited

U.S. PATENT DOCUMENTS

| | | |
|---|---|---|
| 3,100,555 | 8/1963 | Ashton ........................... 52/309.1 X |
| 4,259,821 | 4/1981 | Bush .................................... 52/309.1 |
| 4,758,458 | 3/1988 | Schutze . | |
| 5,036,641 | 2/1991 | Viry . | |

FOREIGN PATENT DOCUMENTS

| | | |
|---|---|---|
| 563162 | 11/1932 | Fed. Rep. of Germany ...... 403/217 |
| 3931478 | 11/1989 | Fed. Rep. of Germany . |
| 1021738 | 6/1983 | U.S.S.R. ................................ 52/721 |
| 969752 | 9/1964 | United Kingdom ............... 52/309.4 |

Primary Examiner—Carl D. Friedman
Assistant Examiner—Kevin D. Wilkens
Attorney, Agent, or Firm—Salter & Michaelson

[57] ABSTRACT

A framework is formed from a plurality of thin-walled, round composite fiber rods having a pressure-resistant foam core and walls. The walls include at least one layer of axially parallel fibers. The framework is constructed from strut rods, transverse rods and joint plates which are operative for connecting the strut rods to the transverse rods. The joint plates are formed from a composite fiber material. Axially parallel recesses are provided in the walls of the strut rods, and the recesses have a width corresponding to the thickness of the joint plates. The recesses extend diagonally through the foam core of the strut rods, and the joint plates are inserted into the recesses where they are glued in place. The transverse rods are provided with slots in the ends thereof. The joint plates are inserted into the slots and glued to join the strut rods to the transverse rods.

12 Claims, 3 Drawing Sheets

FRAMEWORK MADE FROM THIN-WALLED ROUND COMPOSITE FIBRE RODS

BACKGROUND OF THE INVENTION

The invention relates to a framework and in particular to a framework made from thin-walled round composite fibre rods.

A framework of this type is known from U.S. Pat. No. 4,758,458. In this known framework, for a glued connection between two rods which lie at an angle to each other and comprise reinforced-fibre plastics with a round cross section, connection elements are used which have a flat portion and connected thereto portions curved according to the cross section of the rods and having an angle of contact between 90 and 180 degrees.

Further a corner connection for a frame construction with at least two rods lying at an angle to each other made from reinforced fibre plastics with a round cross section is known, in which at least one rod abuts with its end interlocking laterally against another rod and the two rods are connected by means of opposed connection elements which are mirror images of each other and have a flat portion and portions connected thereto curved according to the cross section of the rods and having an angle of contact of about 90 degrees. Also, in this known arrangement, longitudinally of the wide edges of the flat portions of the connection elements a terminating rod is glued between these edges and abuts at its ends interlocking laterally against the two rods connected by the connection elements (DE 39 31 478 C1).

In frameworks difficulties may arise with these known connection elements especially if a plurality of rods, for example transverse and/or diagonal rods, are to be connected to a continuous strut rod at a joint point of a three-dimensional framework structure.

SUMMARY OF THE INVENTION

It is the object of the invention to provide a framework of the above-specified type in which the connection of the transverse and/or diagonal rods to the strut rods is improved.

According to the invention there is provided a framework of thin-walled, round composite fibre rods comprising a pressure-resistant foam core and walls, said walls comprising at least one layer of axially parallel unidirectional elongate fibres, said framework comprising strut rods, transverse and/or diagonal rods, and connection elements for connecting said strut rods to said transverse and/or diagonal rods, said connection elements comprising Joint plates of composite fibre material and having a plurality of edges, wherein axially-parallel recesses are provided in said walls of said strut rods, said recesses having a width corresponding to the thickness of said joint plates, and said recesses extending diagonally through said foam core of said strut rods up to the opposite side of said walls of said strut rods, wherein said Joint plates are inserted into said recesses and glued at the inward one of said edges to the inside of said walls of said strut rods opposite said recesses, and also glued to said foam core at their widths engaging said strut rods, and wherein said transverse and/or diagonal rods have ends, said ends being provided with slots, said slots having a width corresponding to said thickness of said joint plates, whereby said slots overlap said joint plates at both sides thereof.

BRIEF DESCRIPTION OF THE DRAWINGS

Preferred embodiments of the present invention will now be described, by way of example only, with reference to the accompanying drawings, of which.

DESCRIPTION OF THE PREFERRED EMBODIMENTS

Basically the invention provides a framework of thin-walled, round composite fibre rods with a pressure-resistant foam core, the walls of which have at least one layer of axially parallel unidirectional elongate fibres, in which the framework consists of strut rods and transverse and/or diagonal rods and in which the transverse and/or diagonal rods are connected to the strut rods via connection elements, wherein the transverse and/or diagonal rods are connected to the strut rods by joint plates made of composite fibre material, in the walls of the strut rods on the one hand axially parallel recesses are provided with a width (d) corresponding to the thickness of the joint plates, and extend diagonally through the foam core up to the opposite inside of the walls of the strut rods, the joint plates are inserted into these recesses and glued at their inward edge to the inside of the walls of the strut rods, which are opposite the recess and at their widths engaging the strut rod to the foam core and the transverse and/or diagonal rods are provided at their ends with slots with a width corresponding to the thickness (d) of the joint plates, whereby they overlap the joint plates on both sides.

Figure 1:
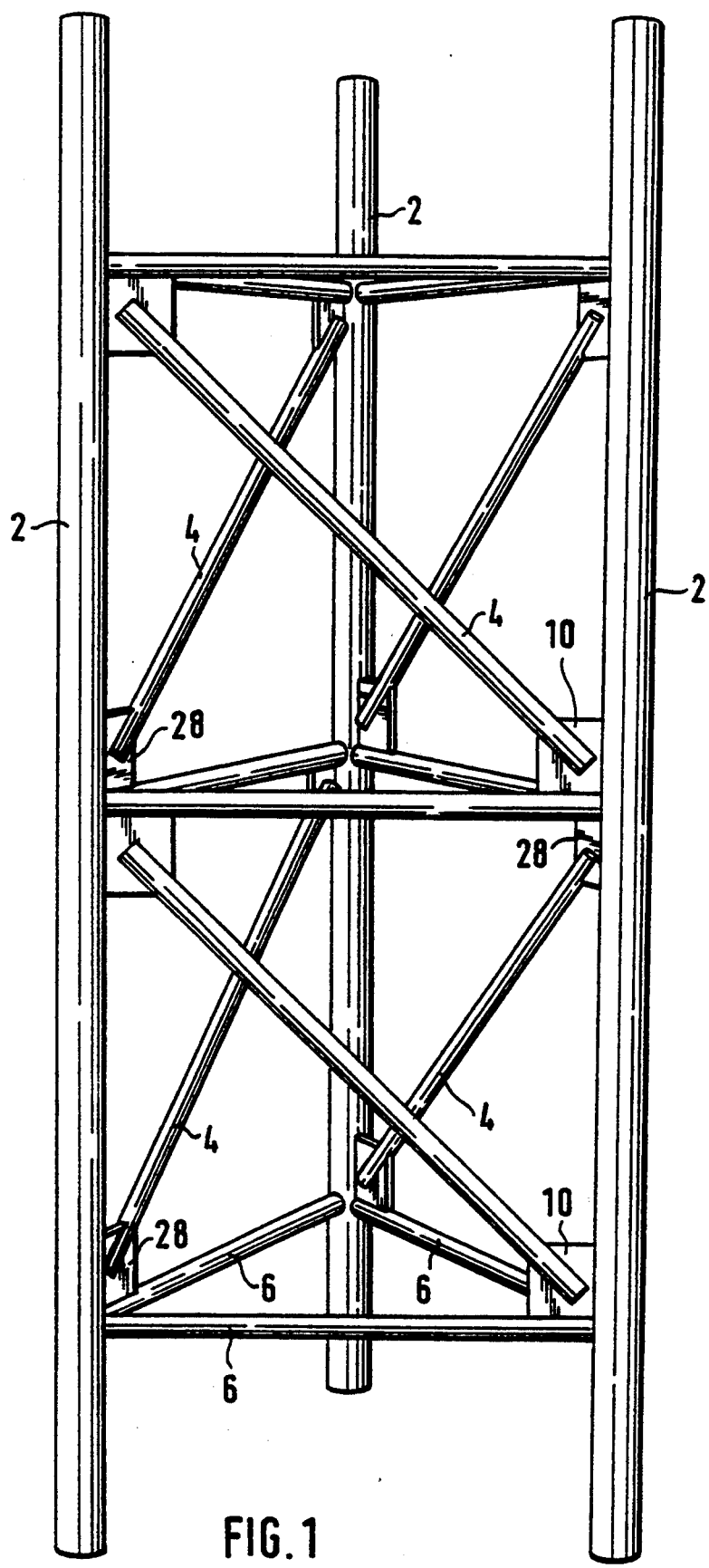
FIG. 1 shows a view of a three-dimensional framework.

Referring now to the drawings, the three-dimensional framework shown in FIG. 1 has three parallel longitudinal strut rods 2. Diagonal rods 4 and transverse rods 6 are arranged between two adjacent strut rods and are connected via joint plates 10 to the strut rods, as described further below in detail with reference to FIGS. 2 and 3. The struts form in each case a framework joint with the joint plates and the diagonal and transverse rods connected thereto. The basic structure of such a framework is known with the transverse rods 6 arranged perpendicularly—i.e. at an angle of 90 degrees—to the strut rods and with the diagonal rods 4 lying at an angle of for example 45 degrees to the strut rods.

Three transverse rods 6 in each case lie in one plane. The diagonal rods lie parallel to each other in each of the three framework planes in the embodiment shown in FIG. 1. Flat frameworks have only two parallel strut rods 2 and transverse and diagonal rods lying therebetween.

Figure 2:
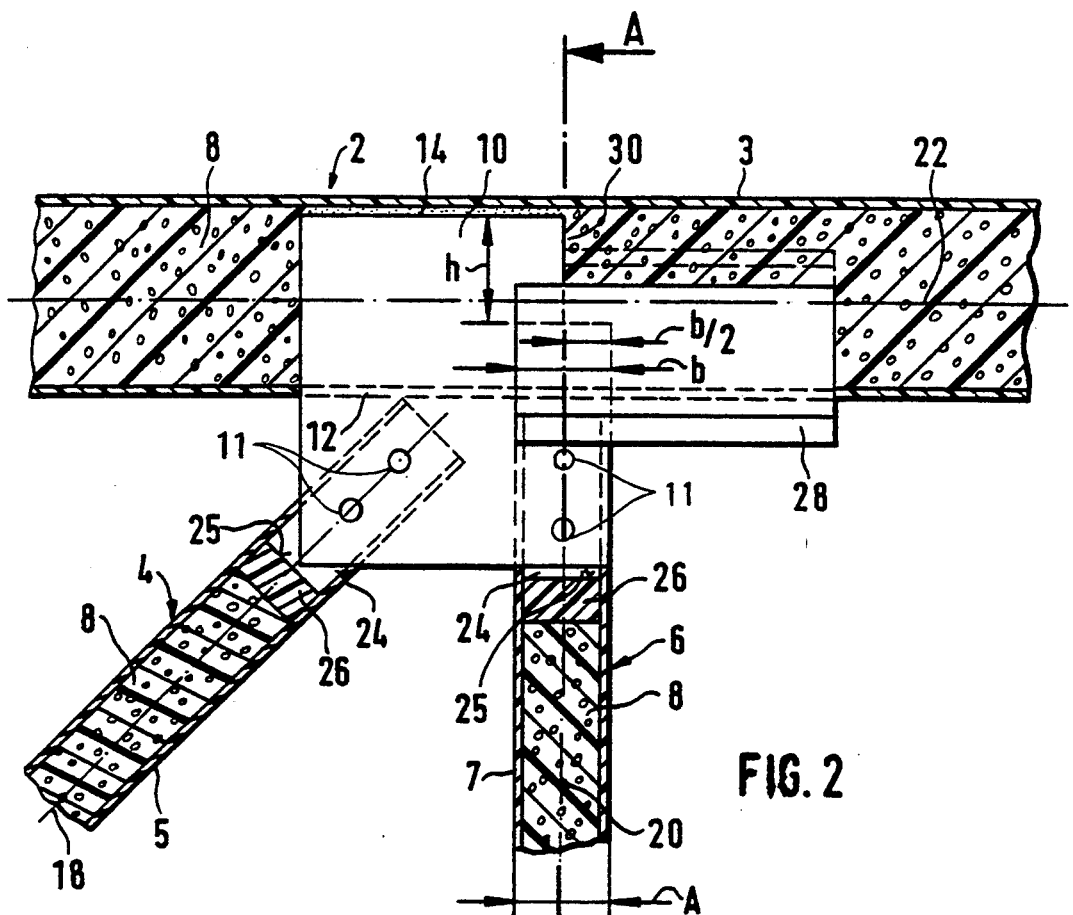
FIG. 2 shows a side view of a framework joint in section along the line C-D in FIG. 3.

In FIG. 2 a framework joint is shown in which diagonal rods 4 and transverse rods 6 are connected to a strut rod 2. Longitudinally and transversely of the framework corresponding framework joints are provided at a spacing, as can be seen from FIG. 1.

The strut rods 2 and the diagonal rods 4 and transverse rods 6 are known thin-walled composite fibre rods with a round cross section, the walls of which 3, 5, 7 contain at least one layer of axially parallel unidirectional elongate fibres, on to which is applied on the outside at least one layer of elongate fibres crossing at an angle from the rod axis. The rods also have a relatively incompressible foam core 8 transverse to the longitudinal direction of the rods, with which the buckling resistance of the thin-walled rods is increased. Conventional carbon fibres are preferably provided as the unidirectional fibres. The crossing elongate fibres may also be formed as a plaited hose made of thin glass fibres.

The joint plate 10 provided as a connection element consists of a composite fibre material, preferably with carbon fibres. This joint plate 10 has a multi-directional fibre laminate the fibres of which run in $+/-45$ degree direction relative to the axis 22 of the strut rods 2. In addition fibres may also be provided which run in a 90 degree direction to the axis 22 of the strut rod.

A recess 12 parallel to the axis is provided at one side in the walls 3 of the strut rod 2, to which a slot is connected which extends diagonally through the foam core 8 to the inside of the part of the walls 3 of the strut rod 2 which is opposite the recess 12. The recess 12 has a width which is slightly greater than the thickness d of the joint plate 10.

The joint plate 10 engages through the axially parallel recess 12 which is arranged in the walls 3 of the strut rod 2 into the slot in the strut rod 2 and extends up to the inside of the walls 3 of the strut rod 2 opposite the recess 12. The edge 14 of the joint plate 10 preferably abuts directly against the inside of the walls 3 which then form a stop determining the position of the joint plate. It may also lie at a small spacing therefrom and then abut indirectly against the walls via a layer of a rigidly hardening glue.

The joint plate 10 is connected to the strut rod 2 in the region of the recess 12 and in the region of the walls opposite thereto via gluing points 16. In addition there is gluing of the wide sides of the inserted portion of the Joint plate 10 to the surfaces of the foam core 8 bordering the slot. The forces acting in the plane of the joint plates are thus transmitted as shear forces onto the foam core and onto the inside of the walls of the strut rod, against which the joint plate abuts directly or indirectly.

Figure 3:
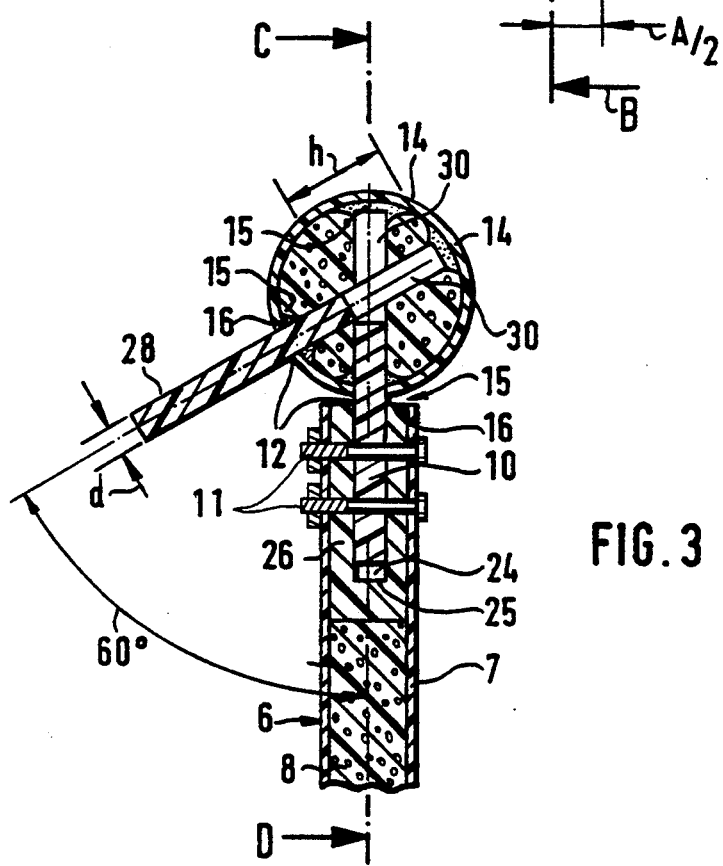
FIG. 3 shows a section along the line A-B in FIG. 2.

It is particularly preferred when manufacturing the recess 12 and the slot in the foam core 8 in the region of the recess 12 and in the region of the opposite inside of the walls to provide undercutting 15 bordering on the inside of the walls, as shown in FIG. 3. In this way the glue forms fillet joints between the joint plate 10 and the strut rod 2 which facilitate better shear or thrust force transmission, since through them a larger gluing surface is achieved both at the joint plate 10 and at the inside of the rod walls.

In the embodiment shown a diagonal rod 4 on the one hand and on the other hand a transverse rod 6 are connected to the joint plate 10 in the conventional manner so that their axes 18, 20 intersect on the axis 22 of the strut rod 2. The transverse and diagonal rods 4, 6 are provided at their ends with slots 24, as shown in FIG. 3 for the transverse rod 6. The rods are pushed on to the joint plate 10 with the slotted portion and then connected to the joint plate 10. A glue connection may be provided as a connection of the transverse and diagonal rods to the joint plate, or a connection with the aid of bolts 11.

With three-dimensional frameworks, for example frameworks with a triangular cross section, as shown in FIG. 1, for each framework plane joint plates 10 have to be provided which are then to be arranged in the strut rod 2 at the framework joints offset at an appropriate angle, for example at an angle of 60 degrees for a three-dimensional framework with a triangular cross section. The arrangement and formation of a second such joint plate 28 offset by 60 degrees at a joint point is shown in FIGS. 2 and 3 in addition to the joint plate 10. It is inserted into the strut rod and glued therein in the same way as described above through a recess 12 with a slot extending diagonally through the foam core.

On statics considerations it is necessary in three-dimensional frameworks to arrange all of the transverse rods of the individual framework planes in each case in a single transverse plane. The two joint plates 10, 28 must therefore overlap in an axial direction at least over a length L, which corresponds to the outer diameter A of the transverse rods. For this purpose the two joint plates 10 and 28 are provided in their mutually overlapping regions from say the rod axis 22 up to the inside of the walls of the strut rod 2, which is opposite the recess 12, with a recess 30 having a height h greater than half the inner diameter of the walls 3 of the strut rod 2, but smaller than ⅔ of this diameter and a width b slightly larger than half the diameter A/2 of the transverse rod 6. In this way in each case in the region of the transverse planes of the framework in which the transverse rods 6 are to be arranged a region for the connection of the transverse rods is provided in this transverse plane at each of the joint plates 10, 28.

When using CFK (synthetic fibre compound) plates the joint plates 10 may be made relatively thin, particularly if using glue for the connection of diagonal and transverse rods 4, 6. The weakening of the cross section of the strut rod which results particularly from splitting the unidirectional elongate fibres in the region of the recesses 12, arises in the first approximation from the ratio of the thickness of the joint plates 10, 28 to the periphery of the strut rod. With a strut rod of 20 mm diameter and a joint plate thickness of 2 mm the weakening of the rod cross section as a result of the joint plate in a flat framework amounts to about 3%, in three-dimensional frameworks with joint plates offset from each other at an angle, about 6%.

The tensile and compression forces in the diagonal and transverse rods 6, 8 which have a diameter A of 10–12 mm for example with a diameter of the strut rods of 20 mm, are with glue connections introduced into the joint plates 10 as shear forces. The rigidity of the foam core of the diagonal and transverse rods 6, 8 is insufficient in many cases for transmitting these shear forces. The slotted ends of these rods have to be strengthened in order to achieve the required shear strength of the glue surfaces. Strengthening also has to be provided for connections with the aid of bolts.

For this purpose, with the embodiment according to FIGS. 2 and 3 in the region of the slots 24 in the ends of the diagonal and transverse rods 4, 6, a rigid filling element 26 in each case made of a light material is provided, for example fibre-reinforced plastics, which has a higher rigidity than the foam of the foam core 8. At the rod ends the foam core 8 is cut into in the region in which the slots are cut or are removed up to under the lower end 25 of the slot. The externally cylindrical filling element 26 with an outer diameter slightly less than the inner diameter of the rod walls and an axial length greater than the depth of the slot is glued into the ends of the rod. The slot 24 is preferably cut into the rod end after hardening the glue. Via the filling element the predominant part of the axial forces acting in the transverse and/or diagonal rods is transmitted as a shear force to the joint plate via the glue surface. Such a filling element may comprise a fibre reinforced plastic and also be formed as an injection moulded element which with larger diameters may even be provided with through openings and which may already be provided with the slot.

Two other embodiments of such strengthening are shown in FIGS. 4 and 5 and FIGS. 6 and 7 on a larger scale than FIGS. 2 and 3.

Figure 4:
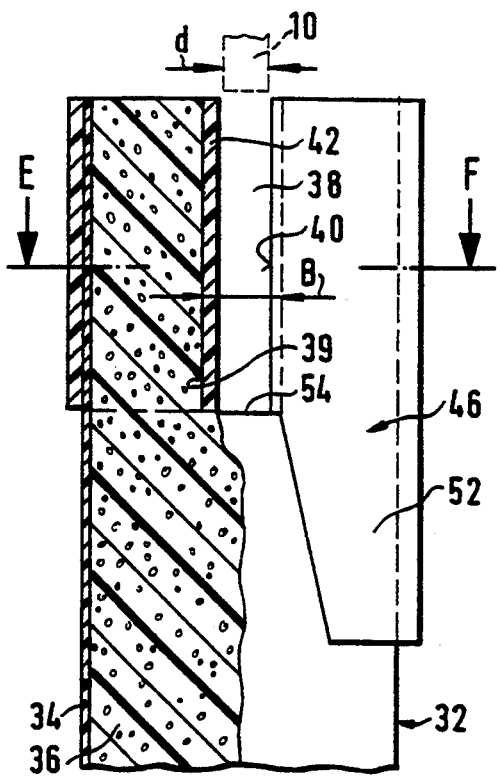
FIG. 4 shows a side view of an end of a diagonal or transverse rod with an embodiment of a reinforcement, in which to the left the rod is shown axially in section.
Figure 5:
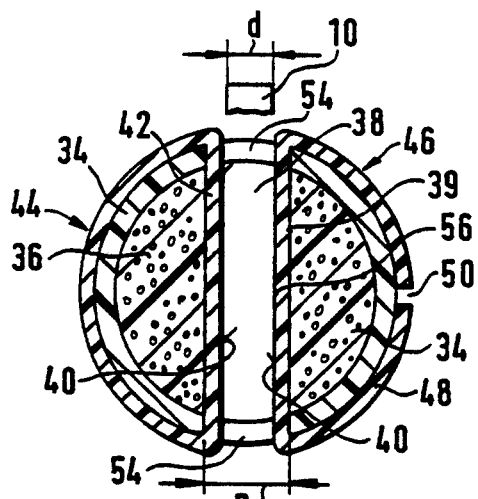
FIG. 5 shows a section along the line E-F in FIG. 4.

In the embodiment according to FIGS. 4 and 5 the rod 32 is provided at its end with a slot 38 cutting through the rod walls 34 and the foam core 36, the width B of said slot being greater than the thickness d of the joint disc 10 indicated in broken lines. The parallel walls 40 of the slot 38 are formed here in each case by a portion 42 of a composite fibre material which is part of fibre fabric tube portions 44 which are impregnated with synthetic resin and extends in each case through the slot 38 and externally about the two circle segment-shaped portions of the rod end which are separated by the slot 38.

The two fabric tubes 44 wetted with resin may be shaped before hardening in the region of the slot 38 with the aid of a shaping plate by which the fabric tube portions 42 in the slot 38 are pressed against the flat surfaces 39 of the foam core 36.

Instead of shaping with fabric tubes wetted with resin in situ pre-fabricated shaped elements 46 may also be used as strengthening elements, as illustrated on the right in FIGS. 4 and 5. In order to manufacture these shaped elements 46 a fabric tube may be drawn on to a core the cross section of which corresponds to the cross section of the circle segment shaped portions at the end of the rod which are separated by the slot 38, wetted with synthetic resin and hardened. The fabric tube is then provided in its rounded cross section part 48 with a longitudinal slot 50 preferably centrally in a longitudinal direction, as shown on the right in FIG. 5. Such a shaped element 46 may further be so formed that the rounded walls extend to below the lower end 54 of the slot 38 with a portion 52 on the outer periphery of the rod 32, as is shown in FIG. 4. Thus a weak point of the rod in the region of the lower end 54 of the slot 38 is strengthened. Shaped elements 46 constructed in this way may be then pushed on to the rod ends and glued externally to the rod walls and preferably also to the surface 56 of the foam core 36 which borders the slot 38. The longitudinal slot 50 facilitates a definite pressing force for gluing to the outside of the rod.

Figure 6:
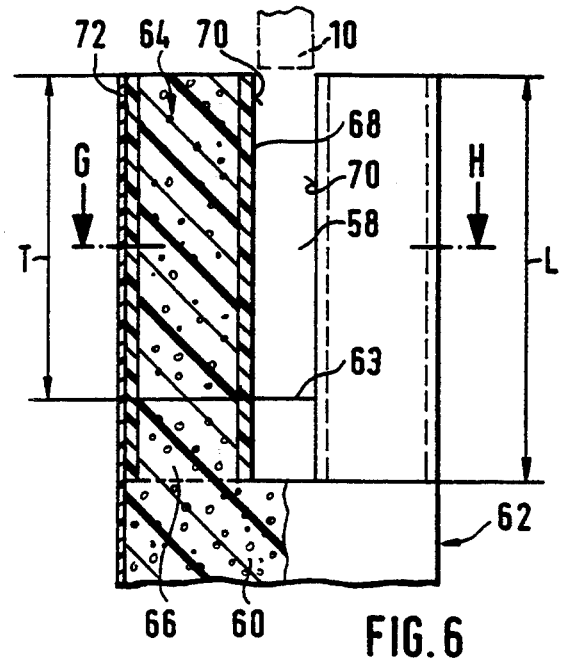
FIG. 6 shows a side view of an end of a diagonal or transverse rod in a further embodiment of a reinforcement, in which to the left the rod is shown axially in section.
Figure 7:
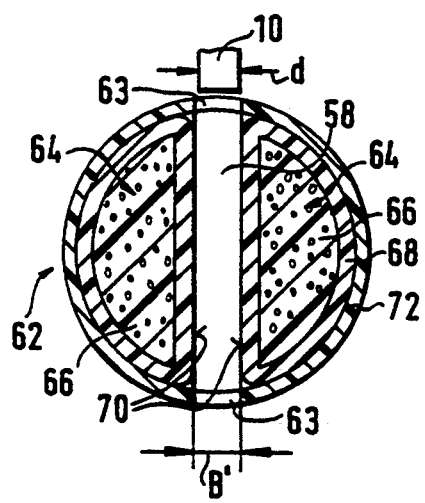
FIG. 7 shows a section along the line G-H in FIG. 6.

In the embodiment according to FIGS. 6 and 7 the slot 58 in the rod end has a width B', as with the embodiment according to FIGS. 2 and 3, which width is slightly larger than the thickness d of the joint plate indicated in broken lines. The foam core 60 of the rod 62 is removed to below the lower end 63 of the slot 58. Two strengthening elements 64 are inserted into the rod end and have circle segment-shaped foam core portions 66 which are covered by a fibre fabric tube 68 which is wetted with a resin. These strengthening elements 64 have a length L which is greater than the depth T of the slot 58. They extend therefore up to beyond the base 62 of the slot 58, preferably up to the bordering end of the foam core 60 of the rod.

With this embodiment too the flat surfaces 70 of the strengthening elements 64 which delimit the slot may be shaped in situ via a shaping plate which is slightly oversize relative to the thickness of the joint plate 10. Thus the dimensions of the two strengthening elements 64 are preferably to be selected so that the rounded surface of the strengthening element with the fabric tube 68 is pressed against the inside of the rod walls 72 by the shaping plate. Contact pressure below the lower end 62 of the slot 58 may be achieved by providing the shaping plate with an offset corresponding to the inner diameter of the rod walls, with which the ends of the strengthening elements 64 which project under half of the lower end 62 of the slot 58 are pressed against the inside of the rod walls so that here too a definite gluing is ensured.

The embodiment according to FIGS. 6 and 7 also has the advantage that the weak point of the rod is strengthened in the region of the lower end 62 of the slot 58.

It will be understood that the above description of the present invention is susceptible to various modifications, changes and adaptations.

What is claimed is:

1. A framework of thin-walled, round composite fibre rods comprising a pressure-resistant foam core and walls, said walls comprising at least one layer of axially parallel unidirectional elongate fibres, said framework comprising strut rods, transverse or diagonal rods, and connection elements for connecting said strut rods to said transverse or diagonal rods, said connection elements comprising joint plates of composite fibre material and having a plurality of edges, wherein axially-parallel recesses are provided in said walls of said strut rods, said recesses having a width corresponding to the thickness of said joint plates, and said recesses extending diagonally through said foam core of said strut rods up to the opposite side of said walls of said strut rods, wherein said joint plates are inserted into said recesses and glued at the inward one of said edges to the inside of said walls of said strut rods opposite said recesses, and also glued to said foam core at their widths engaging said strut rods, and wherein said transverse or diagonal rods have ends, said ends being provided with slots, said slots having a width corresponding to said thickness of said joint plates, whereby said slots overlap said joint plates at both sides thereof.

2. A framework according to claim 1, wherein said foam core of said strut rods is undercut on both sides of the slotted area in the region of said recess and in the region opposite said recess, bordering said inner walls.

3. A framework according to claim 1, wherein said joint plate has a multi directional laminate comprising fibres, said fibres running substantially in +/−45 degree direction relative to said axis of the strut rods.

4. A three-dimensional framework according to claim 1, wherein in order to form a three-dimensional corner in which three transverse rods are arranged in a cross plane of said framework, two of said joint plates are arranged at an angle to each other and in the longitudinal direction of said strut rod with an overlap corresponding to the diameter of said transverse rods and are provided in said overlap region at the bordering edges of their portions lying in said strut rod with cut away portions, the width of which corresponds to half the diameter of said transverse rods and the depth of which measured from the inner edge of said joint plates is greater than half, but smaller than three-quarters of the inner diameter of said strut rod.

5. A framework according to claim 1, wherein said transverse or diagonal rods are glued to said joint plates.

6. A framework according to claim 1, wherein bolts are provided to connect said transverse or diagonal rods to the joint plates.

7. A framework according to claim 1, wherein said transverse or diagonal rods are provided at their ends in the region of said slot with a strengthening element made from a shear-resistant material, said strengthening element forming shear-resistant walls bordering said slot and being glued over an area to said walls of said rod.

8. A framework according to claim 7, wherein at the end of said rod said foam core is removed to below the lower end of said slot and at least one said strengthening element is inserted bordering the slot with shear-resistant walls and abutting against the inner wall of said rod and glued thereto.

9. A framework according to claim 8, wherein said strengthening element is constructed as a shaped body of a composite fibre material.

10. A framework according to claim 9, wherein two shaped bodies comprising composite fibre material are inserted into said rod end, bordering said slot, and have a foam core with a cross-section in the shape of a circle segment and a fabric hose arranged thereon, and are glued to the inside of said tubular walls, said shaped bodies extending with their lower ends below the lower end of said slot into said rod.

11. A framework according to claim 7, wherein said rod is covered in said slotted region with fabric hoses embedded in a resin matrix, these extending in each case through said slot and over the bordering outer periphery of said rod end and form the slot walls in said slot.

12. A framework according to claim 7, wherein thin-walled shaped bodies made of composite fibre material are glued on to the slotted end of said rod and have a circle segment shaped cross section, with a flat wall and a curved wall, delimit said slot in each case with said flat wall, are provided in their curved wall with an axial elongate slot and said curved walls extend beyond the lower end of said flat wall which extends through said slot.

* * * * *